United States Patent

[11] 3,537,490

[72] Inventors Gerald J. Shaw and
 William H. Hill, Shreveport, Louisiana
[21] Appl. No. 757,739
[22] Filed Sept. 5, 1968
[45] Patented Nov. 3, 1970
[73] Assignee Beaird-Poulan Inc.
 Shreveport, Louisiana
 a corporation of Delaware

[54] RECIPROCATING BLADE SAW
 5 Claims, 8 Drawing Figs.
[52] U.S. Cl. .................................................. 143/68, 30/166
[51] Int. Cl. ............................................... B27b 11/02
[50] Field of Search ....................................... 143/60–68; 30/166

[56] References Cited
UNITED STATES PATENTS
964,669 7/1910 May et al. ..................... 143/68
1,364,054 12/1920 Adams .......................... 143/68
2,895,514 7/1959 Wright .................... 143/68(–3)UX
3,155,128 11/1964 Godfrey et al. ............ 143/68(–5)UX Primary Examiner—Donald R. Schran
Attorney—Newton, Hopkins and Ormsby ABSTRACT: A gasoline engine driven reciprocating saw having an engine crankshaft connected to the saw blade through a gearing and push rod arrangement. The components of the saw are arranged so that the principal movement of each component is along the central axis of the saw which passes through the approximate center of gravity thereof. One of the gears of the gearing arrangement is connected to the saw blade by a first push rod to convert rotary motion into reciprocal motion and is connected to a counterweight by another push rod. The push rods are arranged so that the saw blade and counterweight are always moving in the opposite direction for the counterweight to counterbalance the vibrating action of the cutting blade and its associated components.

Patented Nov. 3, 1970

INVENTORS
GERALD J. SHAW
WILLIAM H. HILL
BY Newton, Hopkins,
& Ormsby
Attorneys

Patented Nov. 3, 1970

INVENTORS
GERALD J. SHAW
WILLIAM H. HILL

BY *Newton, Hopkins,*
*& Ormsby*
*Attorneys*

3,537,490

RECIPROCATING BLADE SAW

SPECIFICATION

The present invention pertains to saws generally, but more in particular to a gasoline engine driven saw adapted to power a reciprocating blade for the purpose of cutting wood.

While the present invention generally resembles a chain saw, it has for one of its objects the provision of a cutting means, not in the conventional endless chain, but in a reciprocating blade with teeth formed along one edge thereof.

Another object of the invention is the provision of a reciprocating blade positioned along more-or-less the central longitudinal axis of the saw to provide a convenient balance for an operator.

A further object of the invention is the provision of a gear train to reduce the reciprocatory movements of the cutting blade to a speed considerably less than the engine speed of the purpose of reducing wear and vibration.

There are three generally accepted forces in a device of this type which create an unbalance:

1. ROTATING UNBALANCE—a force due to the weight of the large end of the connecting rod and crankpin. This can be resolved or counterbalanced by the use of counterweights on the crankshaft.
2. PRIMARY SHAKING FORCE—resulting from the rapid starting and stopping of the piston in its travel. This force is just as great as the rotating unbalance and cannot be balanced out. Fortunately, however, it can be given direction by over or under weighting of the crankshaft counterweights.
3. SECONDARY SHAKING FORCE—arising from the rapid back-and-forth pendulum motion of the connecting rod. Neither can this force be balanced out; but it is relatively small in comparison with the other forces.

In the present invention wherein a blade is made to reciprocate with its associated drive mechanism, there is yet another force of considerable value which must be balanced out if the full benefits of a blade cutting saw are to be enjoyed.

It will be remembered that perfect balance cannot be obtained in a two-cycle engine arrangement and the overall magnitude of the vibration remains the same, being governed in direction by the general design and mass of the unit and its components as aforementioned.

It has been found desirable, in a unit of the present type, to so design and engineer the unit that the resultant of the shaking forces would lie in the fore-and-aft direction rather than in the up-and-down direction. Such an arrangement allows some of the shock to be absorbed by the log which the saw is cutting rather than being transferred to the hands of an operator through the handle bar.

It is a further object of the invention, therefore, to so design the components of the unit, together with its general mass, that the major direction of the vibrating forces will occur along the longitudinal axial plane of the saw and are minimized in the opposite plane.

Other objects and advantages of the invention will become apparent in the course of the following detailed description when viewed together with the accompanying drawing in which.

Figure 1:
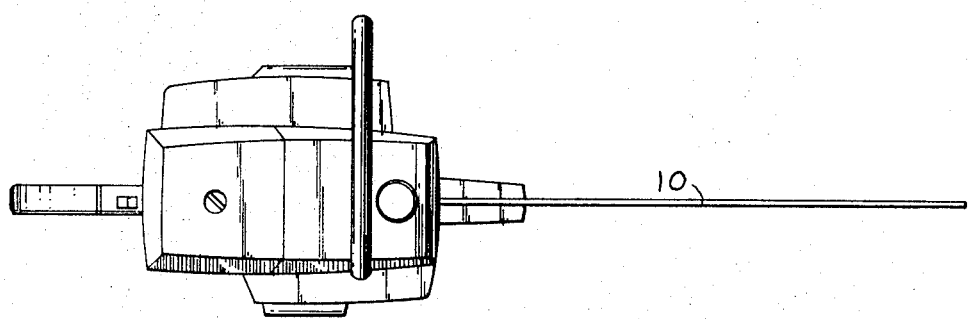
FIG. 1 is a top plan view of a wood cutting saw made in accordance with the teachings of the present invention.

In FIG. 1 the saw is shown in a top or plan view with a blade 10 extended from the front end of the saw and lying on a plane not only through the central axis of the saw, but also through the approximate center of gravity.

Figure 2:
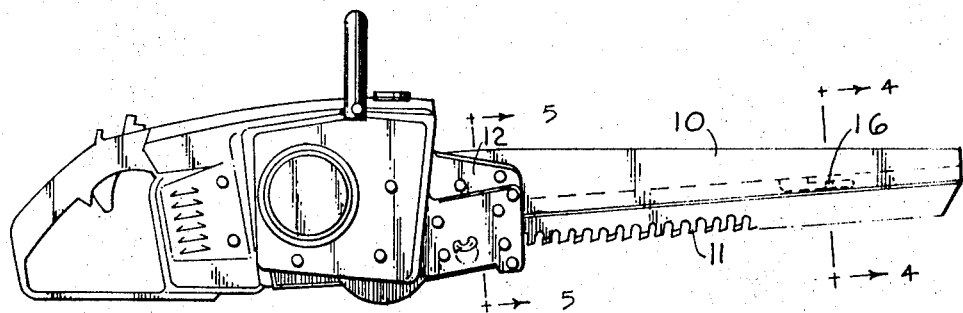
FIG. 2 is a side elevational view of the saw illustrated in FIG. 1.

FIG. 2 shows the guide 10 as mounted to the body portion of the saw by means of screws 12. The bottom edge of the guide 10 is provided with a slot 13 suitable for receiving the cutting blade 11.

Figure 3:
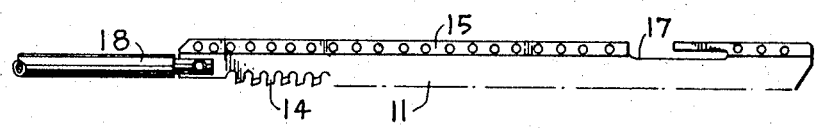
FIG. 3 is a detailed view of the actual reciprocating cutting blade removed from its stationary guide.
Figure 4:
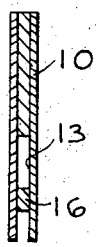
FIG. 4 is a detailed sectional view taken along line 4-4 of FIG. 2, but with the reciprocating blade removed.

In FIG. 3 the cutting blade 11, as illustrated in this side elevational view, is provided with cutting teeth 14 of the configuration shown, the top edge 15 of the blade being of a thickness suitable for being snugly received in the slot 13 of the guide bar 10. In the guide bar 10 there is a pin 16 strategically located so as to be engageable with a slot 17 formed on the forward end of the cutting blade 10. The inner end of the blade is affixed to a push rod 18 by means of which the blade 11 is moved along the slotted guide bar 10 in a reciprocatory cutting action.

Figure 7:
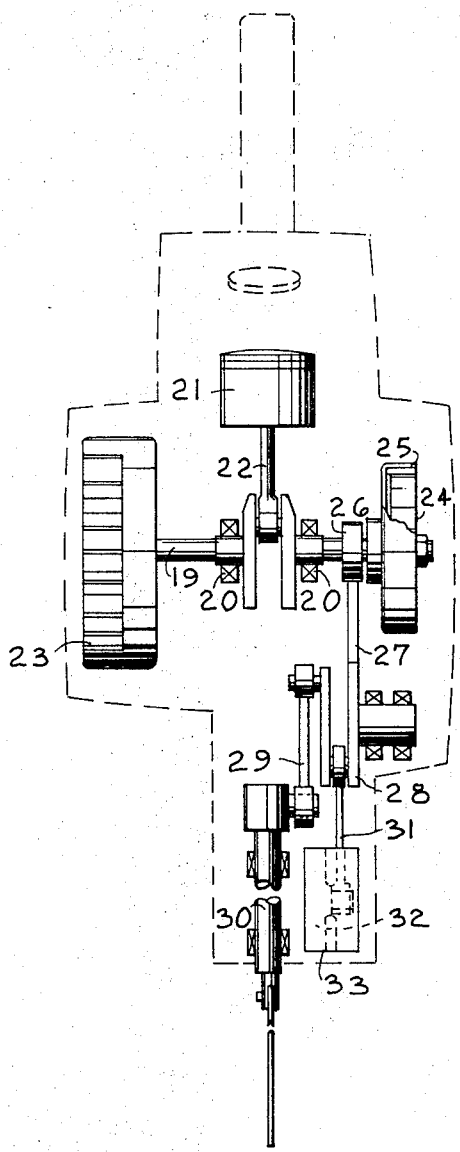
FIG. 7 is a pictorial diagram of the gear train and balancing features of the saw; and, FIG. 8 is a broken, isometric view illustrating the reciprocating mechanism showing its offset position with respect to the main drive mechanism of the saw.
Figure 6:
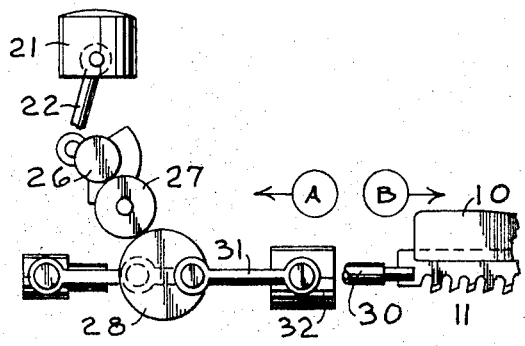
FIG. 6 is a side elevational view pictorially illustrating the main drive and balancing mechanism of the saw.
Figure 8:
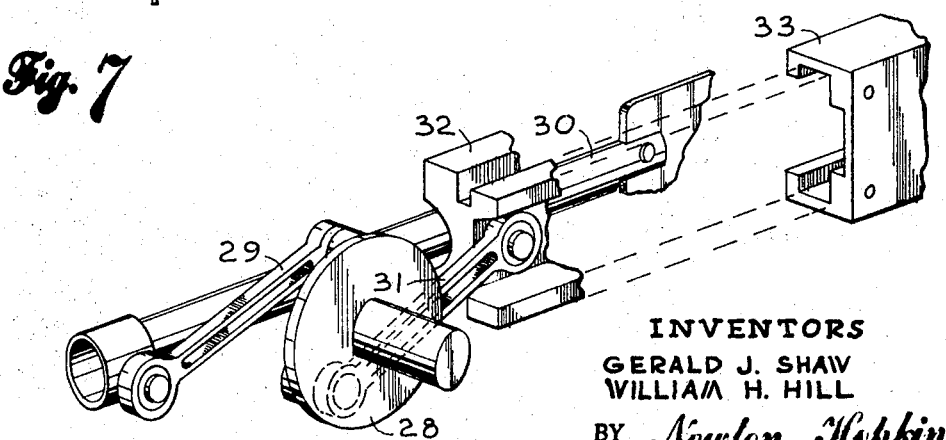

The present invention lies in the components and their particular arrangements more clearly shown by reference to FIGS. 6, 7 and 8. Here, numeral 19 designates the conventional engine crankshaft component rotatably journaled on bearings 20. The crankshaft 19 is rotated in the usual manner by the conventional piston 21 and its corresponding connecting rod 22. At one end of the crankshaft 19 is a magneto flywheel 23 and at the other end is a centrifugally operated clutch 24. Associated with the clutch 24 is a clutch drum 25 with an integrally formed pinion gear 26 adapted for free rotation on the crankshaft 19. The clutch pinion 26 is the driving member of a three-gear gear train, the other members being an idler gear 27 and a final driven gear 28.

Figure 5:
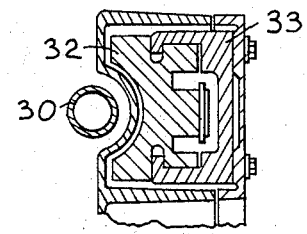
FIG. 5 is a cross-sectional view taken along lines 5-5 of FIG. 2.

The final driven gear 28 is arranged to drive two connecting rods. One connecting rod 29 connects the drive to a push rod 30 which, in turn, is affixed to the cutting blade 11. The other rod 31 connects the driven gear 28 to a weight 32 adapted for movement along a track 33. The cross section as shown in FIG. 5 will more clearly illustrate these arrangements.

By reference to FIG. 6 it can be seen that as the reciprocating blade moves in one direction of travel, as at "B", the counterweight 32 is moved in the opposite direction, as at "A". The mass and density of the counterweight 32 are calculated mathematically to counterbalance the shaking forces caused by the fore-and-aft movement of the blade as pointed out in the beginning of this specification. In the present instance, the counterweight 32 is calculated to not only counterbalance the vibrating action of the cutting blade and its attendant components, but also to give direction to the overall shaking forces of the unit so that the major amplitude of vibration will be in the fore-and-aft plane of the unit. Thus, when the blade is put to use in a cut, the log or other object being cut, will help absorb a portion of the mass vibration without the same being transferred to the operator's hands through the handlebars.

As seen by reference to FIG. 7, the planes of operation of the cutting blade and the counterweight system lie adjacent each other through the approximate center of the unit's mass and center of gravity. Hence the rotating couple produced upon running the engine is reduced to a minimum. Moreover, the number of teeth on the driven gear 28 is twice the number of those on the driving pinion 26, so that the blade 11 will be driven at one-half the speed of the engine. This reduction in speed helps to reduce both the vibration and also the wear on the component parts.

The invention is believed to be an advancement over the prior art wherein the cutting blades have been connected directly to the driving parts of the engine without any reduction in speed and where the arrangement of the component parts have prohibited an over or under counterbalancing of the shaking forces created upon running such a unit.

While we have described the invention in detail in a particular embodiment, it is to be understood that this has been by way of example only, and that changes in the size and shape of the various components could be made without departing from the spirit and scope of the invention as defined by the following claims.

We claim:

1. In a gasoline engine driven saw having a crankshaft and a centrifugally operable clutch, a clutch drum associated with said clutch, a driving pinion affixed to said clutch drum and operable therewith upon actuation of said clutch, an intermediate gear enmeshed with said pinion, a final driven gear enmeshed with said intermediate gear, said final driven gear provided with two crankpins set laterally at equidistant points from the axial centerline of said gear and diametrically opposed to each other, and a pair of connecting rods operatively associated with said driven gear, one of said rods operatively connected to a cutting blade and the other of said rods connected to a counterbalancing weight.

2. In a gasoline engine driven saw provided with a crankshaft, a centrifugally operable clutch on said crankshaft, a clutch drum associated with said clutch, a driving pinion affixed to said drum and operable for rotation therewith upon actuation of said clutch, an intermediate gear enmeshed with said pinion, a final driven gear enmeshed with said intermediate gear, a push rod slidably journaled in said saw, a cutting blade attached to said push rod, a connecting rod joining said push rod and said final driven gear whereby said cutting blade may be given reciprocatory movements upon rotation of said final driven gear, and a second connecting rod rotatably affixed at one end thereof to said final driven gear and at the other to a counterbalancing weight.

3. In a gasoline engine driven saw having a crankshaft and a centrifugally operable clutch on said crankshaft, a gear train associated with said clutch, a cutting blade operatively associated with said gear train, means for inducing reciprocating movement to said cutting blade upon rotation of the gears of said gear train, a counterbalancing weight slidably mounted in said saw and also adapted for slidable reciprocatory movements by said gear train, and means for moving said cutting blade mechanism and said slidable weight in simultaneous opposite directions of travel.

4. In a gasoline engine driven saw having a crankshaft and a centrifugally operable clutch upon said shaft, a gear train operable by said clutch, a cutting blade mechanism mounted for reciprocatory movement on said saw, means on said gear train for imparting reciprocatory movement to said cutting blade mechanism, and a counterbalancing weight also on said saw and operatively associated with said gear train for reciprocatory movements thereof in simultaneous opposite directions to said cutting blade mechanism, both said cutting blade mechanism and said counterbalancing weight being substantially on the axial centerline of the general mass of said saw.

5. In combination, with a gasoline engine having a crankshaft and a centrifugally operated clutch, a gear train operatively responsive to the actuation of said clutch, said gear train including a pinion gear on said clutch, an intermediate gear enmeshed with said pinion, and a final drive gear enmeshed with said intermediate gear; a cutting blade connected to said final gear and arranged for reciprocatory movement in response to the rotation of said gear, said cutting blade being positioned on the central longitudinal axis through the engine, and a counterbalancing weight associated also with and responsive to the rotation of said final drive gear, said counterbalancing weight lying immediately adjacent the said longitudinal axis of said saw and in a plane parallel thereto.